Patented July 23, 1940

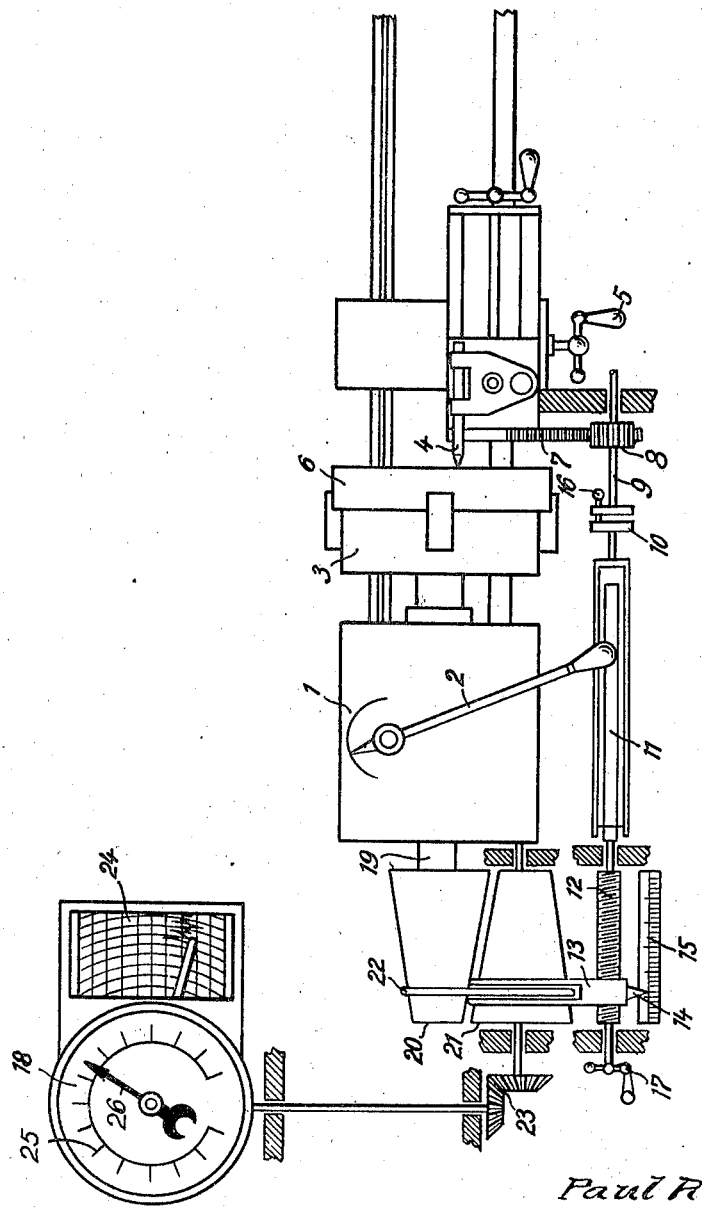

2,209,037

UNITED STATES PATENT OFFICE 2,209,037

DEVICE FOR CONTROL OF THE CUTTING SPEED OF MACHINE TOOLS

Paul Riegger, Villingen, Schwarzwald, Germany, assignor to Kienzle Taxameter- und Apparate-A.-G., Villingen, Schwarzwald, Germany Application August 30, 1938, Serial No. 227,544
In Germany August 31, 1937

17 Claims. (Cl. 82—2)

This invention relates to improvements in a device for control of the cutting speed of machine tools having stepless regulation of the rotative speed. It is possible with lathes having stepless regulation of the rotative speed to vary the speed of the workpiece as desired and thus the cutting speed during operation, for example, by means of a Leonard or hydraulic gear. Since for different materials and for each method of working a definite cutting speed only assures the greatest possible economy, the cutting speed also should be kept constant with varying diameter of the workpiece through corresponding adaption to its speed. To attain the foregoing ends there has been at disposal as indicator the speed measuring instrument only, and the suitable cutting speed for the respective diameter and workpiece must then be ascertained with the aid of tables.

The invention provides an apparatus, which readily makes it possible to read and to maintain the correct cutting speed as a function of variations of the diameter of the cutting path of the workpiece and its material. This is so attained that the drive of a speed measuring instrument, indicating the rotative speed of the workpiece, is regulable in accordance with the adjustment of the cutting tool such as of the cutting tool of a lathe.

For the purpose of describing the invention in detail an example embodying the same, when used with a lathe, is shown in the accompanying drawing.

The hydraulic gear on the spindle stock 1 of the lathe permits the stepless rotative speed control and can be controlled by a lever 2, to rotate the face plate 3 at different speeds. By means of the crank 5, the cutting tool 4 is moved transversely of the face of the work piece 6. This movement of the tool 4 is transmitted by means of a rack 7 and pinion 8 to the shaft 9 connected through a coupling 10 with one member of a telescope shaft, the other member of which is connected to and may rotate a screw spindle 12, having threaded engagement with a slide 13, carrying a pointer 14 movable over a scale 15 calibrated to show diameters of the cutting path on the work piece 6.

The coupling 10 may be disconnected by operation of the member 16 after which the tool 4 and spindle 12 may be moved independently of each other, the latter then being rotatable by the crank 17.

The speed measuring instrument 18 operates in known manner and is driven by a change-speed transmission gear now to be explained from the live stock shaft 19, which shaft rotates at the same speed as the work piece 6. Said gear comprises conical rollers 20, 21, the roller 20 being connected to the shaft 19. The belt 22 connecting the rollers is shifted longitudinally of the rollers by the slide 13 having shift arms between which the belt is received. The instrument 18 is driven from the shaft of roller 21 through bevel gears 23, and is provided with a hand or pointer 26 movable over a dial 25. The indicated speed is also recorded on a clock-work driven record strip 24.

The operation of the device is as follows:

The work piece 6 having been clamped in place and the coupling 10 disconnected, the point of the cutting tool is adjusted to the desired cutting path diameter, for example 20 millimeters. By means of the crank 17, the pointer 14 is moved to indicate the marking 20 millimeters on the scale 15. When the pointer 14 and tool 4 are adjusted to the same cutting path diameter, the coupling 10 is recoupled.

The parts of the device are so proportioned that with the device adjusted as above explained, the correct cutting speed at the tool would be indicated as such by the instrument 18.

Then with the device adjusted and running as explained, if the cutting tool be moved outward by operating the crank 5 the slide 13 would move to the right through the operation of parts 8 to 12. Consequently the belt 22 would move to the right raising the ratio of the transmission gear, indicating a greater speed on the dial 25 in accordance with the increased linear cutting speed at the tool brought about by the increased cutting path diameter. The operator seeing this increased speed would immediately shift the handle 2 to reduce the speed of the work piece until the speed measuring instrument indicated the said correct speed.

In like manner, inward movement of the tool would cause the instrument to indicate decreased speed until the operator operated the handle 2 to bring the instrument reading back to the correct cutting speed. Thus it is noted that during the whole operation the operator should adjust the handle 2 whenever necessary to keep the pointer 26 always indicating the correct cutting speed.

When working on longitudinal work pieces of infrequently changing substantially constant cutting diameter, with the coupling 10 disconnected, the operator may by means of the crank 17 manually adjust the pointer 14 to said diameter, after which the proper cutting speed may be read on the scale 25.

I claim:

1. A device for controlling the cutting speed of machine tools having stepless rotative regulation, comprising a speed measuring instrument indicating the rotative speed of the workpiece, and a controlling device regulating the drive of the said speed measuring instrument in accordance with the adjustment of the cutting tool.

2. A device for controlling the cutting speed of machine tools having stepless rotative regulation, comprising a speed measuring instrument indicating the rotative speed of the workpiece and being provided with a hand cooperating with a scale, and a controlling device regulating the drive of the said speed measuring instrument in accordance with the adjustment of the cutting tool.

3. A device for controlling the cutting speed of machine tools having stepless rotative regulation, comprising a stepless speed change gear and a speed measuring instrument being coupled to the shaft of a workpiece-carrier by means of the said speed change gear, the said speed change gear having an operating member determining the transmission ratio and being coupled to the cutting tool in such a manner that the adjustment of the tool causes a corresponding adjustment of the operating member.

4. A device for controlling the cutting speed of machine tools having stepless rotative regulation, comprising a frictional speed change gear, a speed measuring instrument being coupled to the shaft of a workpiece-carrier by means of the said speed change gear, the said speed change gear having an adjustable operating member, and transmission members regulated by the tool and acting on the said operating member.

5. A device for controlling the cutting speed of machine tools having stepless rotative regulation, comprising a frictional speed change gear, a speed measuring instrument being coupled to the shaft of a workpiece-carrier by means of the said speed change gear having an adjustable operating member, and transmission members regulated by the tool and acting on the said operating member, a coupling being provided in the line of the transmission members acting on the operating member of the speed change gear and being controlled by the tool.

6. A device for controlling the cutting speed of machine tools having stepless rotative regulation, comprising a speed measuring instrument indicating the rotative speed of the workpiece, a controlling device regulating the drive of the said speed measuring instrument in accordance with the adjustment of the cutting tool and a recording device for recording the cutting speed simultaneously on a recording strip.

7. In combination, a machine having a rotative work piece holder, and a tool holder movable in and out relative to the axis of rotation of the work piece; said device comprising a speed indicator; a transmission means between said rotative holder and indicator; and means operated by said tool holder for changing the ratio of said transmission means substantially in accordance with a function of the distance of the tool of the tool holder from the center of rotation of the work piece.

8. A device for indicating cutting the speed of a rotative work piece carried on a rotating part of a machine tool having a tool holder movable in and out relative to the axis of rotation of the work piece; said device comprising a speed measuring instrument; transmission means between said part and instrument; and means operated by said tool holder for changing the ratio of said transmission means substantially in accordance with a function of the distance of the tool of the tool holder from the center of rotation of the work piece.

9. A device for controlling the cutting speed of the cutting tool of a machine having a movable part for moving a work piece, means for effecting regulation of the movement of said part and a tool holder for the cutting tool, said tool holder being movable in a way which changes the cutting speed at the tool; said device comprising a speed measuring instrument; transmission means for driving said instrument from said movable part; and means operated by said tool holder for changing the ratio of said transmission means to change the indicated speed of the instrument relative to said speed of said movable part substantially as a function of the change of cutting speed at the tool.

10. A device for controlling the cutting speed of a machine tool having a rotative part for rotating the work piece, means for effecting rotative regulation of said part and a movable tool holder for the cutting tool; said device comprising a speed measuring instrument; and drive means for instrument operated by said tool holder to change the indicated speed of the measuring instrument in accordance with a function of the distance of the tool from the center of rotation.

11. The combination, with a machine having a rotative part for rotating the work piece, means for effecting regulation of the rotative speed of said part and a movable tool holder for the cutting tool, of a device for controlling the cutting speed at the tool, said device comprising a speed measuring instrument; transmission means for driving said instrument from said rotative part; and means operated by said tool holder for changing the ratio of said transmission means to change the indicated speed of the instrument relative to said rotative speed substantially as the distance of the tool from the center of rotation varies.

12. A device for controlling the cutting speed of a lathe having a rotative part for rotating the work piece, means for effecting stepless rotative regulation of said part and a tool holder for moving the tool in, out and longitudinally relative to the rotative axis of the work piece; said device comprising a speed measuring instrument; a speed change gear coupled between said rotative part and the instrument and having an adjustable operating member for changing the ratio of the gear; and an operative connection between said tool holder and said member for changing said ratio to change the indicated speed of the instrument relative to said rotative speed substantially as the distance of the tool from said axis varies; whereby the operator may by reading of the instrument adjust the rotative speed of the work piece to maintain the indicated speed constant, thereby maintaining the linear cutting speed constant.

13. A device for controlling the cutting speed of a lathe having a rotative part for rotating the work piece, means for effecting stepless rotative regulation of said part and a tool holder for moving the tool in, out and longitudinally relative to the rotative axis of the work piece; said device comprising an instrument rotative speed of the work piece a speed change gear coupled between said rotative part and the instrument and having an adjustable operating member for changing the ratio of the gear; and an operative connection between said tool holder and said member for changing said ratio to change the indicated speed of the instrument relative to said rotative speed substantially as the distance of the tool from said axis varies.

14. A device as in claim 13 in which said operative connection comprises a telescoping part longitudinal to the longitudinal axis and having its ends operatively connected respectively to the tool holder and said member.

15. A device as in claim 13, comprising means for at will disconnecting the tool holder from said member; and an indicator associated with said member for indicating positions of the member for respective cutting path diameters of the work piece.

16. A device for controlling cutting the speed of a rotative work piece on a machine tool having a tool movable in and out relative to the axis of rotation of the work piece; said device comprising a rotary member; means for changing the speed of said rotary member in accordance with a function of the distance of the tool from the center of rotation of the work piece; and means for adjusting the rotative speed of the work piece in accordance with the speed of said rotating part.

17. A device for indicating cutting the speed of a rotative work piece on a machine tool having a tool movable in and out relative to the axis of rotation of the work piece; said device comprising a rotary member; means having an adjustable operating member for changing the speed of said rotary member; an operative connection between said tool holder and said member for changing the speed of said member in accordance with a function of the distance of the tool from the center of rotation of the work piece; and means for adjusting the rotative speed of the work piece in accordance with the speed of said rotating part.

PAUL RIEGGER.